FRANCIS X. LAMB and
PAUL P. HUBER
INVENTORS

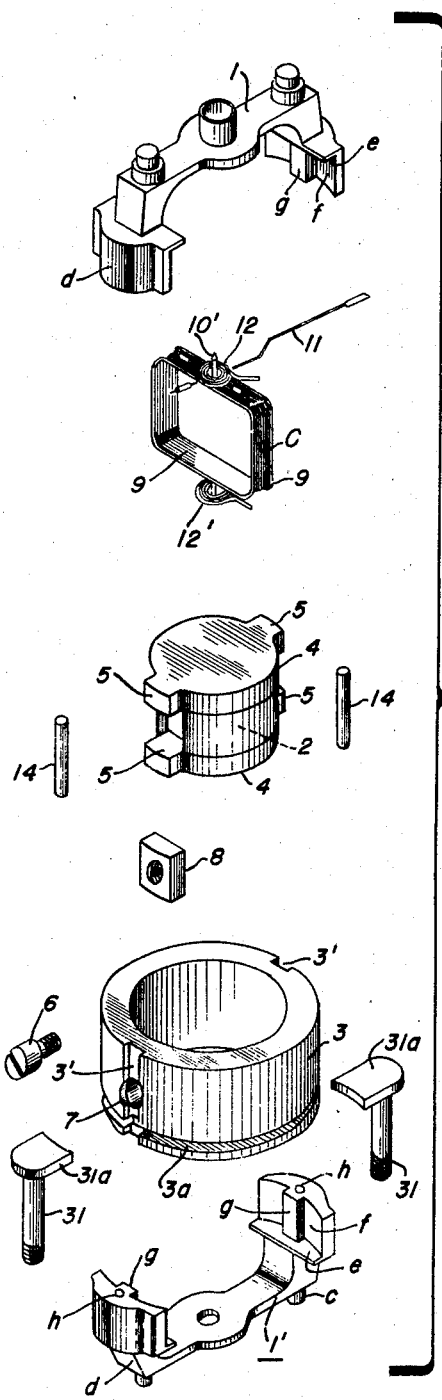
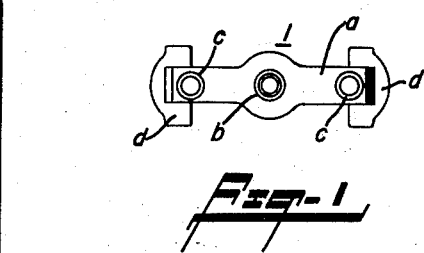
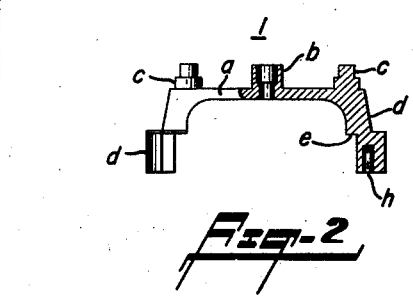
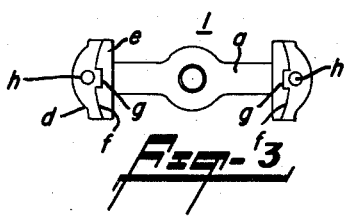
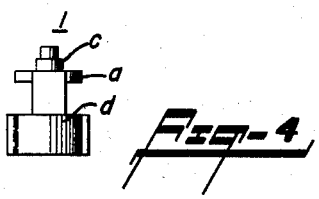
FRANCIS X. LAMB and
PAUL P. HUBER
INVENTORS May 19, 1959 F. X. LAMB ET AL 2,887,657
ELECTRICAL INSTRUMENT
Filed Aug. 10, 1954 3 Sheets-Sheet 2
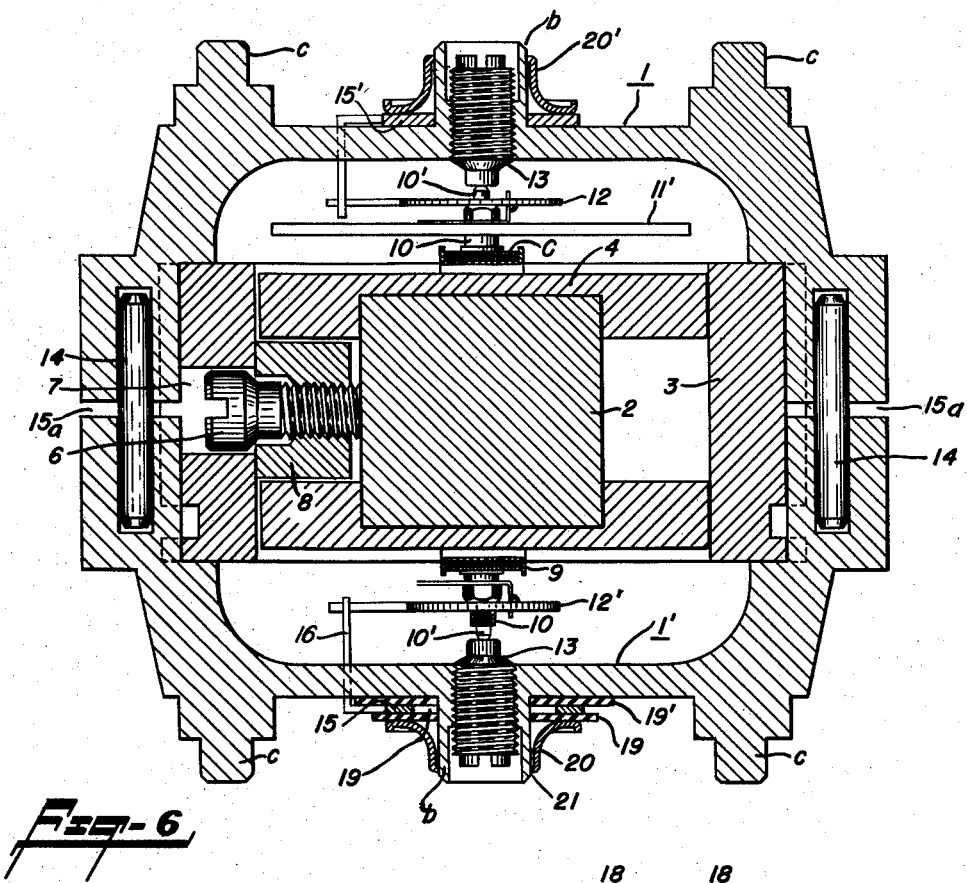
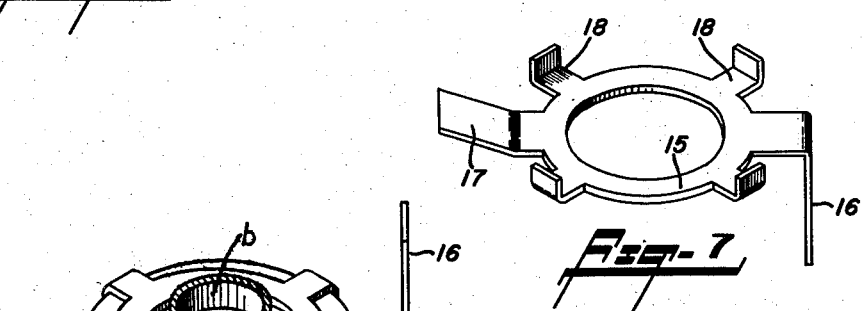
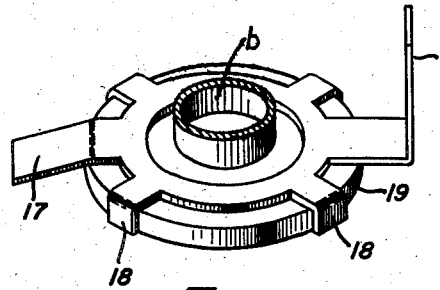
FRANCIS X. LAMB and
PAUL P. HUBER
INVENTORS
BY
Rudolph E. Quick
ATTORNEY May 19, 1959  F. X. LAMB ET AL  2,887,657
ELECTRICAL INSTRUMENT
Filed Aug. 10, 1954  3 Sheets-Sheet 3

BY Rudolph J. Junick
ATTORNEY

United States Patent Office 2,887,657
Patented May 19, 1959

2,887,657

ELECTRICAL INSTRUMENT

Francis X. Lamb, East Orange, and Paul P. Huber, Hillside, N.J., assignors, by mesne assignments, to Daystrom, Incorporated, Murray Hill, N.J., a corporation of New Jersey Application August 10, 1954, Serial No. 448,964

8 Claims. (Cl. 324—151)

This invention relates to electrical instruments of the core magnet type and more particularly to a novel mechanical construction of such instruments affording certain manufacturing and assembly economies and advantages.

Instruments of the class contemplated by this invention comprise a generally cylindrical, transversely magnetized core disposed within a circular soft-iron yoke. The core is spaced from the wall defining a circular hole in the yoke to form a magnetic flux path within which a wire wound movable coil operates. Such movable coil is pivotally supported for rotational movement by alined bearings that are carried by bridge members extending across opposite ends of the yoke. In accordnace with conventional practice the bridge members are secured to the yoke by threaded posts and/or screws and the bearings are carried by screws passing through the bridge members which screws are secured in relatively fixed position by means of cooperating nuts and lockwashers. Further, the assembled instrument mechanism and the scale plate require the use of numerous screws, nuts and/or other special clamping means to properly secure them within the instrument case.

An object of this invention is the provision of magnetic core type electrical instruments having component parts of simple construction which can be quickly and economically assembled and/or taken down for inspection and repair.

An object of this invention is the provision of a magnetic core type electrical instrument having die cast bridge members that are clamped upon the instrument yoke to support the usual jewel bearings and scale plate and to locate the assembled instrument mechanism within a suitable case.

An object of this invention is the provision of a magnetic core type electrical instrument in which the bridge members disposed at opposite ends of the instrument yoke are firmly secured to each other and the yoke by press-fitting pins which enter into aligned bores in the bridge members, whereby the usual threaded connections for securing the bridges to the instrument magnetic system are eliminated.

An object of this invention is the provision of novel, die cast bridge members for use in a magnetic core type electrical instrument, said bridge members being of identical construction and including a cross bar terminating in depending end portions, an integral boss centrally disposed on the cross bar and having a threaded hole therein, inwardly directed, integral guide ribs adapted to fit within opposed longitudinal grooves formed in the outer surface of the instrument yoke, horizontal shoulders extending inwardly from each end portion and adapted to seat on an end surface of the yoke, and a bore in each end portion, said bores being adapted to receive pins by means of which two reversely-disposed bridge members are secured together in the instrument assembly.

These and other objects and advantages of the invention will become apparent from the following detailed description when taken with the accompanying drawings. It will be understood the drawings are for purposes of illustration and are not to be construed as defining the scope or limits of the invention, reference being had for the latter purpose to the claims appended hereto.

Figures 1 and 2 are, respectively, a top plan view and a side elevation, partly in central section, of the upper bridge member of an instrument embodying the invention;

Figures 3 and 4 are, respectively, a bottom plan view and an end elevation of the same;

Figure 5 is an exploded perspective view of component elements of an instrument mechanism embodying the invention;

Figure 6 is a central section, on a larger scale, through the assembled instrument mechanism;

Figure 7 is a perspective view of one of the spring abutments;

Figure 8 is a fragmentary perspective view of the same and an insulating washer on a bearing lug of a bridge member;

Figure 9:
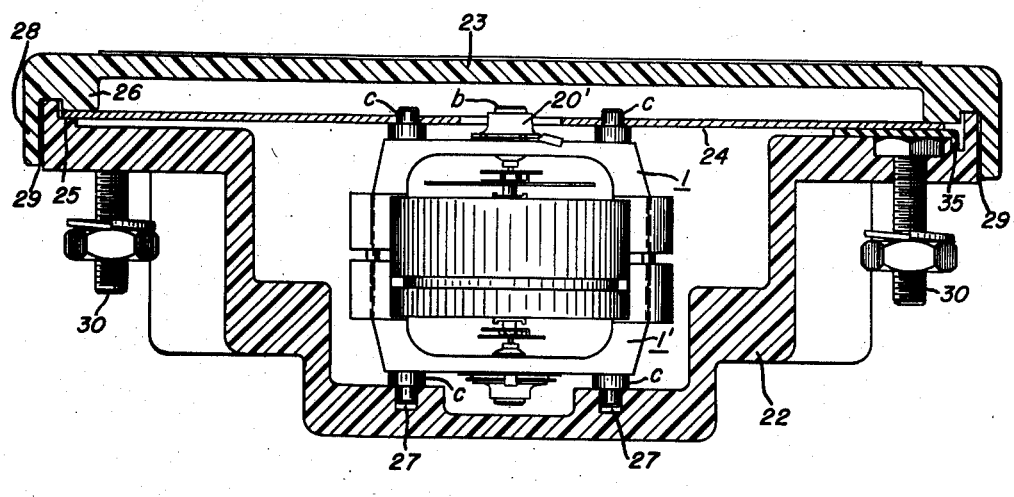
Figure 9 is a central section through an instrument and its case.

In Figures 1 to 4 of the drawings, the reference numeral 1 identifies generally the upper bridge member of an instrument embodying the invention. It comprises a unitary die-casting including a cross arm $a$ with a flat outer surface from which a central cylindrical boss $b$ and end shouldered studs $c$ project, and inwardly projecting legs $d$ with horizontal shoulders $e$ above opposed arcuate surface $f$ from which ribs $g$ project towards each other. The ends of the legs $d$ are relatively heavy and each has a cylindrical bore $h$ adjacent the root of its rib $g$. The cylindrical lug $b$ has a bore therethrough with a larger diameter outer end and a smaller diameter inner end which is subsequently threaded to receive a mounted jewel, as shown in Figure 6.

The lower bridge member 1' is of identical construction and corresponding parts are identified by the reference characters of Figures 1–4 but will not be described in detail.

As shown in Figures 5 and 6, a transversely as distinguished from axially-magnetized, generally cylindrical core 2 is supported axially within the bore of a cylindrical soft-iron yoke 3 by end caps 4 which are press-fitted upon the ends of the core and have diametrically-opposed outwardly-extending ears 5 to space the same from the yoke. The core assembly is anchored in place by a screw 6 which extends loosely through a clearance hole 7 in the yoke 3 and is threaded through a nut 8 to press the core assembly against the opposite inner wall of the yoke.

The movable system is of conventional type and comprises a coil C wound on a rectangular frame 9. The staffs 10 carry the pivots 10' which, together with suitable nuts, serve as means to secure a pointer 11 and spiral springs 12, 12' to the wound frame. In the assembly of the instrument, the pivots 10' are seated in jewels, not shown, carried by the jewel screws 13 which are threaded into the lugs $b$ of bridge members 1 and 1' to support the frame 9 for angular movement with the opposite sides of coil C in the air gap between the magnetized core 2 and the soft iron yoke 3.

The bridge members 1, 1' are secured to each other and upon the yoke 3 by pressing them upon slightly tapered pins 14 fitted into the bores $h$ of the bridge members.

The yoke 3 has diametrically arranged longitudinal recesses 3' for receiving the ribs g of the bridge members and the assembly is exceedingly rigid and rugged since the die metal of the bridge members is malleable and the slight deformation thereof by the tapered pins 14 seats the ribs g firmly within the complementary recesses 3'. The shoulders e are so located on the bridge members 1, 1' that they seat upon the yoke 3 to leave a small gap 15a between the opposed legs d. The bridge members 1, 1' may be removed from the yoke 3 by inserting a tool in these gaps and applying leverage to force the bridge members apart. The bridge members are not damaged by this operation and the instrument may be re-assembled after inspection and/or repair.

The lower abutment for the lower spiral spring 12' is best shown in Figures 7 and 8. Such abutment takes the form of a metal washer 15 consisting of a generally flat plate with a circular aperture, the center of which lies on its axis which is normal to said plate with a projecting arm 16 extending generally parallel to said axis for connection to the outer end of a spring, an opposite and shorter arm 17 which is bent from the plane of the washer for easy access in soldering a terminal wire, not shown, to the spring abutment, and a plurality of short arms 18 with bent or axially-directed end portions which center the abutment on an insulating washer 19. An additional and wider insulating washer 19' is disposed on the other side of the spring abutment and the assembly is fitted over the central lug b of the lower bridge member 1' and retained in place by a resilient metal washer 20 of arcuate form in radial section with an inner flange 21 which frictionally grips the lug b to retain the parts in assembled positions, see Figures 6, 7 and 8. It will be apparent that in such construction the lower spring 12' is electrically insulated from the rest of the mechanism.

The upper spiral spring 12, on the other hand, is grounded to the instrument mechanism, the outer end of such spring being secured to a downwardly-depending arm of the conventional, upper abutment 15', said abutment being secured to the boss b of the upper bridge member 1 by means of a resilient metal washer 20'.

As shown in Figure 9, the assembled instrument mechanism may be housed in a case of circular cross-section comprising a lower cup part 22 of molded plastic material with a relatively deep center portion for receiving the mechanism and an outer shallow portion over which a cover 23 of a transparent plastic is fitted. A scale plate 24 is apertured to fit upon the shouldered studs c of the upper bridge member 1 and its edge is clamped between complementary circular flanges 25 and 26 of the case members 22, 23, respectively. The lower wall of the cup part 22 of the case is provided with bores 27 for receiving the smaller diameter parts of the shouldered lugs c of the lower bridge member 1'. In accordance with conventional practice, and as shown in Figure 5, the pointer 11 has its intermediate portion bent upwardly to bring the active part thereof into a plane overlying the scale plate 24.

The cover 23 has a peripheral flange 28 extending along the adjacent flange of the cup part 22. The manner of securing the cover to the case by simple snap-action means is disclosed in co-pending United States patent application Serial No. 420,717, filed April 2, 1954, in the name of Francis X. Lamb and entitled Electrical Instrument. Briefly, the peripheral flange 28, of the cover, is provided with a plurality of spaced lips directed inwardly toward cooperating notches formed in the lower edge of the flange on the case 22. When the cover is pressed toward the case 22, these lips snap over the case flange and into the notches thereby securely fastening the cover to the case and clamping the scale plate in fixed position.

Terminal connections, not shown, may be brought out of the case in any known or desired manner, and mounting bolts 30 extend through the wall of the outer shallow portion of the case section 22 with their heads seated in recesses in the inner face of that wall, said heads being insulated from the scale plate by suitable means as, for example, tape 35.

Figure 10:
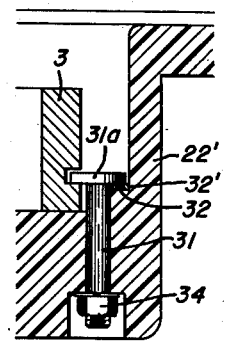
Figure 10 is a fragmentary sectional view of another arrangement for securing the instrument mechanism within its case.

Reverting to Figure 5, the yoke 3 preferably is formed with a circumferential groove 3a to provide an alternative arrangement for securing the instrument within a case when it is desired to avoid any stressing of the scale plate 24. In such a case, the instrument is secured within the case by a pair of bolts 31 having flat heads 31a which seat within groove 3a. As shown in the fragmentary view of Figure 10, the bolts 31 extend through openings in the wall of the case section 22' to receive the cooperating fastening nuts 34. The head 31a of each bolt, rests upon a resilient member 32' carried by the shoulder 32 of the case section 22'.

Figure 11:
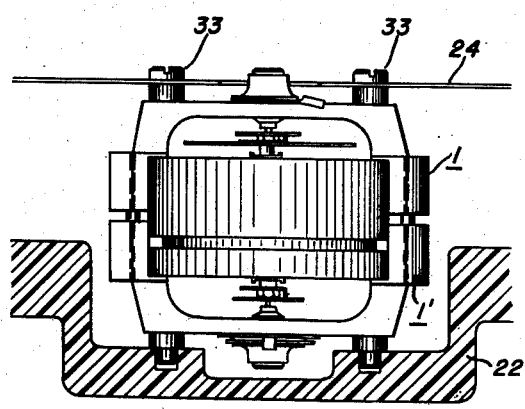
Figure 11 is a fragmentary sectional view similar to Figure 9 but showing another arrangement for securing the scale plate to the instrument.

An alternative form for locating and securing the scale plate is shown in Figure 11. Here the reduced-diameter portion of the studs c, of the upper bridge member 1 is removed, as by a milling operation, and the remaining portion of each such lug is provided with a threaded hole to receive the scale-plate fastening screws 33.

It is to be noted that the great majority of the threaded connections of electrical measuring instruments of conventional construction are eliminated through the use of the die-cast bridge members which are press-fitted upon slightly tapered pins to secure them to each other and to the magnetic system of the instrument. Furthermore, the bridge members are of such construction as to facilitate the mounting of the scale plate upon the instrument and the anchoring of the complete instrument in a case.

Having now described our invention in detail in accordance with the patent statutes, various changes and modifications will suggest themselves to those skilled in this art and it is intended that such changes and modifications shall fall within the spirit and scope of the invention as recited in the following claims.

We claim:

1. An electrical instrument comprising a generally cylindrical core magnetized along a diameter, a soft-iron yoke having a generally circular bore therethrough, means positioning the core coaxial of and securing it within the bore of said yoke, a movable coil encircling said core in an axial plane and provided with alined pivots, a pair of substantially identical non-magnetic bridge members reversely disposed at opposite ends of said yoke, each of the bridge members including integral shoulders abutting the adjacent end surfaces of the yoke and complementary projecting legs extending longitudinally along the outer surface of the yoke, locking pins, force-fitted partially into each of alined bores formed in the complementary legs of the bridge members, and bearing means carried by the bridge members to support the coil for angular movement about the said core.

2. The invention as recited in claim 1, wherein the said yoke is provided with recesses at the exterior surface thereof and in combination with an instrument case having an end wall, and anchoring means to secure the instrument to the case said anchoring means comprising headed studs having the heads disposed within said recesses and threaded shanks extending through the said end wall.

3. An electrical instrument as recited in claim 1, wherein said yoke and bridge members have complementary parts which interlock mechanically when said bridge members are fitted upon the ends of said yoke.

4. An electrical instrument as recited in claim 3, wherein said bridge members are of deformable metal with the said bores adjacent the parts thereof complementary to parts of said yoke, and said locking pins are tapered and of larger diameter than said bores, whereby said bridge members are deformed to engage the complementary parts thereof firmly with the complementary parts of said yoke.

5. An electrical instrument as recited in claim 4, wherein said complementary parts comprise longitudinal grooves in said yoke and longitudinal ribs on the legs of said bridge members.

6. An electrical instrument as recited in claim 1, in combination with an apertured scale plate, and wherein the bridge members include integral studs, the studs of one bridge member extending through the scale plate apertures.

7. An electrical instrument as recited in claim 1, in combination with an instrument case having an end wall with bores formed in the inner surface thereof, and wherein the bridge members include integral studs, and the studs of one bridge member are fitted within the case bores to position the instrument in the case.

8. An electrical instrument comprising a generally cylindrical core magnetized along a diameter; a soft iron yoke having a generally cylindrical bore therethrough; means positioning the core coaxial of and securing it within the bore of the yoke; a movable coil encircling said core in an axial plane and provided with alined pivots; a spiral spring having one end secured to the coil; a pair of substantially identical die-cast bridge members reversely disposed at opposite ends of the yoke, each of the bridge members including a central boss having a threaded hole therein, shoulders abutting the adjacent end surface of the yoke and complementary projecting legs extending longitudinally along the outer surface of the yoke; locking pins force-fitted partially into each of alined bores formed in the complementary legs of the bridge members; bearing means threaded in the bridge bosses and supporting the pivots for angular movement of the coil tbout the core; a spring abutment comprising a metal washer having a hole therein and disposed over a central boss of one bridge member, an offset arm connected to the other end of the said spring and a plurality of radially-extending arms having inwardly offset ends; an insulator washer disposed over the said boss and in surface contact with the abutment, said insulator washer having a hole of smaller diameter than that of the abutment and said washer being confined within the said radially-extending arms; and a resilient metal washer frictionally engaging the said boss and abutting the said insulator.

References Cited in the file of this patent
UNITED STATES PATENTS

| | | |
|---|---|---|
| 1,927,346 | Lawrence | Sept. 19, 1933 |
| 2,290,849 | Triplett | July 21, 1942 |
| 2,327,114 | Lingel | Aug. 17, 1943 |
| 2,364,724 | Klay | Dec. 12, 1944 |
| 2,626,296 | Side | Jan. 20, 1953 |